US011831743B1

(12) United States Patent
Herrera et al.

(10) Patent No.: US 11,831,743 B1
(45) Date of Patent: Nov. 28, 2023

(54) STREAMING ARCHITECTURE FOR PACKET PARSING

(71) Applicant: Xilinx, Inc., San Jose, CA (US)

(72) Inventors: Jaime Herrera, Dublin (IE); Gordon J. Brebner, Monte Sereno, CA (US); Ian McBryan, Dublin (IE); Rowan Lyons, Dublin (IE)

(73) Assignee: XILINX, INC., San Jose, CA (US)

( * ) Notice: Subject to any disclaimer, the term of this patent is extended or adjusted under 35 U.S.C. 154(b) by 311 days.

(21) Appl. No.: 16/242,860

(22) Filed: Jan. 8, 2019

(51) Int. Cl.
*H04L 69/22* (2022.01)
*H04L 69/324* (2022.01)

(52) U.S. Cl.
CPC ............ *H04L 69/22* (2013.01); *H04L 69/324* (2013.01)

(58) Field of Classification Search
CPC ....... H04L 69/22; H04L 69/324; H04L 69/04; H04L 69/166; H04L 29/06; H04L 29/08; H04L 29/0653; H04L 29/0602; H04L 45/38; H04L 45/745; H04L 45/74; H04L 45/24; H04L 45/56; H04L 45/7453; H04L 45/245; H04L 45/72; H04L 45/54; H04L 45/02; H04L 45/60; H04L 45/00; H04L 45/7457; H04L 41/0803; H04L 41/142; H04L 12/721; H04L 12/24; H04L 12/741; H04L 12/26; H04L 12/707; H04L 12/771; H04L 12/1886; H04L 12/56; H04L 12/462; H04L 12/66; H04L 47/2441; H04L 47/2483; H04L 47/625; H04L 47/32; H04L 47/6255; H04L 47/628; H04L 47/60; H04L 47/50; H04L 47/52; H04L 47/34;

(Continued)

(56) References Cited

U.S. PATENT DOCUMENTS 6,778,530 B1 * 8/2004 Greene .................. H04L 45/00
370/389
7,100,078 B1 * 8/2006 Pass ........................ H04L 12/66
714/18

(Continued)

OTHER PUBLICATIONS

Attig, Michael et al., "400 GB/s Programmable Packet Parsing on a Single FPGA," In Proc. ANCS, 2011, pp. 12-23.

(Continued)

*Primary Examiner* — Un C Cho
*Assistant Examiner* — Rasha K Fayed
(74) *Attorney, Agent, or Firm* — Patterson + Sheridan, LLP

(57) ABSTRACT

Apparatus and associated methods relate to packet header field extraction as defined by a high level language and implemented in a minimum number of hardware streaming parsing stages to speculatively extract header fields from among multiple possible header sequences. In an illustrative example, the number of stages may be determined from the longest possible header sequence in any received packet. For each possible header sequence, one or more headers may be assigned to each stage, for example, based on a parse graph. Each pipelined stage may resolve a correct header sequence, for example, by sequentially extracting length and transition information from an adjacent prior stage to determine offset of the next header. By speculatively extracting selected fields from every possible position in each pipeline stage, a correct value may be selected using sequential hardware streaming pipelines to substantially reduce parsing latency.

20 Claims, 12 Drawing Sheets

(58) Field of Classification Search
CPC ... H04L 47/6275; H04L 47/622; H04L 47/74; H04L 49/103; H04L 49/9036; H04L 49/15; H04L 49/101; H04L 49/30; H04L 49/3063; H04L 49/109; H04L 49/3036; H04L 49/9057; H04L 49/3027; H04L 49/9042; H04L 49/3009; H04L 61/103; H04W 28/06; H04W 28/065; G06F 15/8053; G06F 15/17337; G06F 15/16; G06F 15/173; G06F 15/76; G06F 15/78

See application file for complete search history.

(56) References Cited

U.S. PATENT DOCUMENTS

| | | | |
|---|---|---|---|
| 8,625,438 B1 | 1/2014 | Attig | |
| 8,743,882 B1* | 6/2014 | Kopelman | H04L 12/462 370/392 |
| 8,788,512 B2* | 7/2014 | Asaad | G06F 16/24568 707/755 |
| 9,270,517 B1* | 2/2016 | Attig | H04L 69/22 |
| 9,674,081 B1 | 6/2017 | Jiang et al. | |
| 9,899,088 B1 | 2/2018 | Jiang | |
| 9,906,443 B1* | 2/2018 | Singh | H04L 47/74 |
| 10,412,018 B1* | 9/2019 | Feng | H04L 49/1546 |
| 10,505,861 B1* | 12/2019 | Li | H04L 49/3063 |
| 10,911,579 B1* | 2/2021 | Volpe | H04L 45/64 |
| 2002/0196797 A1* | 12/2002 | Battin | H04L 69/04 370/410 |
| 2003/0046429 A1* | 3/2003 | Sonksen | G06F 15/8053 709/246 |
| 2004/0010612 A1* | 1/2004 | Pandya | H04L 69/10 709/213 |
| 2005/0030949 A1* | 2/2005 | Shirakawa | H04L 45/566 370/392 |
| 2005/0058118 A1* | 3/2005 | Davis | H04L 12/2861 370/351 |
| 2010/0257198 A1* | 10/2010 | Cohen | G06F 16/24542 707/E17.014 |
| 2011/0317724 A1* | 12/2011 | Furuta | H04L 1/0045 370/503 |
| 2013/0094507 A1* | 4/2013 | Brebner | H04L 12/56 370/392 |
| 2013/0318107 A1* | 11/2013 | Asaad | G06F 16/24568 707/755 |
| 2014/0328344 A1* | 11/2014 | Bosshart | H04L 45/74 370/392 |
| 2015/0081726 A1* | 3/2015 | Izenberg | G06F 16/90 707/755 |
| 2015/0110113 A1* | 4/2015 | Levy | H04L 69/18 370/392 |
| 2016/0114832 A1* | 4/2016 | Taniguchi | B62D 6/04 701/41 |
| 2016/0246543 A1* | 8/2016 | Williams | G06F 11/3636 |
| 2018/0091278 A1* | 3/2018 | Kanamarlapudi | H04L 1/1864 |
| 2018/0107172 A1* | 4/2018 | Takatsu | G05D 23/1917 |
| 2019/0044866 A1* | 2/2019 | Chilikin | H04L 49/30 |
| 2019/0182366 A1* | 6/2019 | Kfir | H04L 69/22 |
| 2019/0306287 A1* | 10/2019 | Kniplitsch | H04L 47/36 |
| 2019/0306288 A1* | 10/2019 | Reinbold | H04L 65/607 |
| 2021/0266332 A1* | 8/2021 | Li | H04L 69/22 |

OTHER PUBLICATIONS

Gibb, Glen at al., "Design principles for packet parsers," in ANCS, 2013, pp. 13-24.
Kozanitis Christos et al., "Leaping multiple headers in a single bound: Wire-speed parsing using the Kangaroo system," in IEEE INFOCOM, 2010, pp. 830-838.
Benacek, Pavel et al., "P4-to-VHDL: Automatic generation of 100 Gbps packet parsers," in 2016 IEEE 24th Annual International Symposium on Field-Programmable Custom Computing Machines (FCCM), May 2016, pp. 148-155.
Santiago Da Silva, Jeferson et al. "P4-compatible High-level Synthesis of Low Latency 100 GB/s Streaming Packet Parsers in FPGAs," in 26th ACM/SIGDA International Symposium on Field-Programmable Gate Arrays Feb. 25-27, 2018, pp. 1-7.
Specification and drawings for U.S. Appl. No. 15/421,306, filed Jan. 31, 2017, Mohan.

* cited by examiner

STREAMING ARCHITECTURE FOR PACKET PARSING

TECHNICAL FIELD

Various embodiments relate generally to data packet parsing.

BACKGROUND

Data represents information that has useful value. Data can take the form of stored information. Data storage can be in analog form. Data storage can also be in digital form. Data in digital format may be communicated between two nodes. When data is communicated, for example, it can be received and interpreted as a function of time. Some systems that receive communicated digitally-formatted data are based on a clock that determines when a voltage signal is sampled to decide whether a symbol in a data stream is, for example, a one or a zero. Sometimes, data is received without knowing its specific phase information. Phase alignments are performed before launching data or receiving data to ensure data accuracy and data integrity.

A packet in transit includes a stack of headers and a data payload. Headers contain information about the data carried by the packet. At an end system, a packet may begin with a stack of Ethernet, Internet Protocol (IP) and Transfer Control Protocol (TCP) headers, for example. In a core network, a packet may begin with a stack of various Carrier Ethernet or MPLS headers, reflecting enroute encapsulation, for example.

SUMMARY

Apparatus and associated methods relate to packet header field extraction as defined by a high level language and implemented in a minimum number of hardware streaming parsing stages to speculatively extract header fields from among multiple possible header sequences. In an illustrative example, the number of stages may be determined from the longest possible header sequence in any received packet. For each possible header sequence, one or more headers may be assigned to each stage, for example, based on a parse graph. Each pipelined stage may resolve a correct header sequence, for example, by sequentially extracting length and transition information from an adjacent prior stage to determine offset of the next header. By speculatively extracting selected fields from every possible position in each pipeline stage, a correct value may be selected using sequential hardware streaming pipelines to substantially reduce parsing latency.

Various embodiments may achieve one or more advantages. For example, some embodiments may result in a less barrel shifting and reduced FPGA resources. In some embodiments, a high-level language may be used to describe the functionality of a packet processing data plane and abstract away the complexity of the packet processing implementation, which may advantageously leave the user with a convenient way to specify packet processing requirements using a hardware streaming pipeline architecture. In various examples, parsing may be accomplished with reduced time and resources, for example, by selectively extracting desired header field values without the need to duplicate the entire packet and load it into and out of processor-accessible memory.

In an exemplary aspect, an integrated circuit includes a speculative field extraction circuit (SFEC) configured to, for each stage in a pipeline of data packet headers, and for every possible sequence of headers in the data packet, speculatively select a predetermined field from a selected header in the data packet, the selected field corresponding to at least one predetermined bit position within the data packet. The integrated circuit also includes an extracted field processing circuit (EFPC) having m Header Sequence Identifier (HSID) circuits, each of the $2^{nd}$, $3^{rd}$, ... $m^{th}$ HSID circuits, being, respectively, more significant than the $1^{st}$, $2^{nd}$, ... $m-1^{th}$ HSID circuits, and each of the $2^{nd}$, $3^{rd}$, ... $m^{th}$ HSID circuits having a corresponding selector circuit configured to read field information from the selected at least one predetermined field from a corresponding stage of the SFEC. The selector circuit in each of the $2^{nd}$, $3^{rd}$, ... $m^{th}$ HSID circuits selects from among the selected fields to output header field information in response to information selected by the selector circuit of the adjacent, less significant HSID circuit.

In some embodiments, the integrated circuit may also include field extraction (FEM) circuits. Each of the FEM circuits may be configured to align to the data packet to capture, respectively, the actual contents of the extracted field values in a vector output register. The FEM circuits may also be configured to align the data packet in response to an offset information and a transition information received from the corresponding HSID circuit. In some embodiments, the $1^{st}$ HSID circuit may include a register to directly receive the field information from the selected at least one predetermined field from a corresponding 1st stage of the SFEC. The information selected by the selector circuit of the adjacent, less significant HSID circuit may include length and offset information. The information selected by the selector circuit of the adjacent, less significant HSID circuit may also include transition information.

In some embodiments, the predetermined field may include length information associated with the header. The predetermined field may include transition information indicative of a subsequent header in the data packet. In some embodiments, the SFEC may also be configured to select the at least one predetermined field from a header in a data packet for every predetermined possible sequence of the headers in the data packet. The SFEC may also include a register circuit to capture the field value information at the at least one predetermined bit position within the data packet. The predetermined stages may represent a necessary and sufficient number of possible packet header sequences defined according to a predetermined parse graph. In some embodiments, the SFEC and the EFPC may be implemented in an ASIC. In some embodiments, the SFEC and the EFPC may be implemented in programmable logic of a field programmable gate array (FPGA).

In another exemplary aspect, a method to perform data packet parsing on an integrated circuit includes speculatively selecting, with a speculative field extraction circuit (SFEC), and for each stage in a pipeline of data packet headers, and for every possible sequence of headers in the data packet, a predetermined field from a selected header in the data packet, the selected field corresponding to at least one predetermined bit position within the data packet. The method also includes providing an extracted field processing circuit (EFPC) comprising m Header Sequence Identifier (HSID) circuits, each of the $2^{nd}$, $3^{rd}$, ... $m^{th}$ HSID circuits, being, respectively, more significant than the $1^{st}$, $2^{nd}$, ... $m-1^{th}$ HSID circuits, and each of the $2^{nd}$, $3^{rd}$, ... $m^{th}$ HSID circuits comprising a corresponding selector circuit configured to read the field information from the selected at least one predetermined field from a corresponding stage of the SFEC. The selector circuit in each of the $2^{nd}$, $3^{rd}$, ... $m^{th}$ HSID circuits selects from among the selected fields to output header field information in response to information selected by the selector circuit of the adjacent, less significant HSID circuit.

In some embodiments, the integrated circuit may include field extraction circuits. each of the FEM circuits may be configured to align to the data packet to capture, respectively, the actual contents of the extracted field values in a vector output register. In some embodiments, the method may also include aligning, with the FEM circuits, the data packet in response to an offset information and a transition information received from the corresponding HSID circuit.

In some embodiments, the method may also include directly receiving, with the 1st HSID circuit, which comprises a register, the field information from the selected at least one predetermined field from a corresponding 1st stage of the SFEC. The SFEC and the EFPC may be implemented in an ASIC. The SFEC and the EFPC may also be implemented in programmable logic of a field programmable gate array (FPGA). The predetermined field may include transition information indicative of a subsequent header in the data packet.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

To aid understanding, this document is organized as follows. First, an exemplary platform (e.g., FPGA) suitable to perform speculative header field extraction to efficiently parse all possible header sequences in a hardware streaming pipeline architecture is briefly introduced with reference to FIG. 1. Second, with reference to FIGS. 2-5B, the discussion turns to introducing how a speculative field extraction circuit (SFEC) may be deployed to parse data packets in data communication systems. Specifically, an exemplary design-time development environment and method of implementing a speculative parser on a target platform are described with reference to FIGS. 4A-5B. Third, FIG. 6 is described to introduce how an exemplary parse graph can be used to assign all possible headers to a set of parsing stages. Finally, with reference to FIGS. 7A-9, the discussion discloses exemplary implementations of the parsing stages configured to perform speculative header field extraction to efficiently parse all possible header sequences in a hardware streaming pipeline architecture at run-time.

Figure 1:
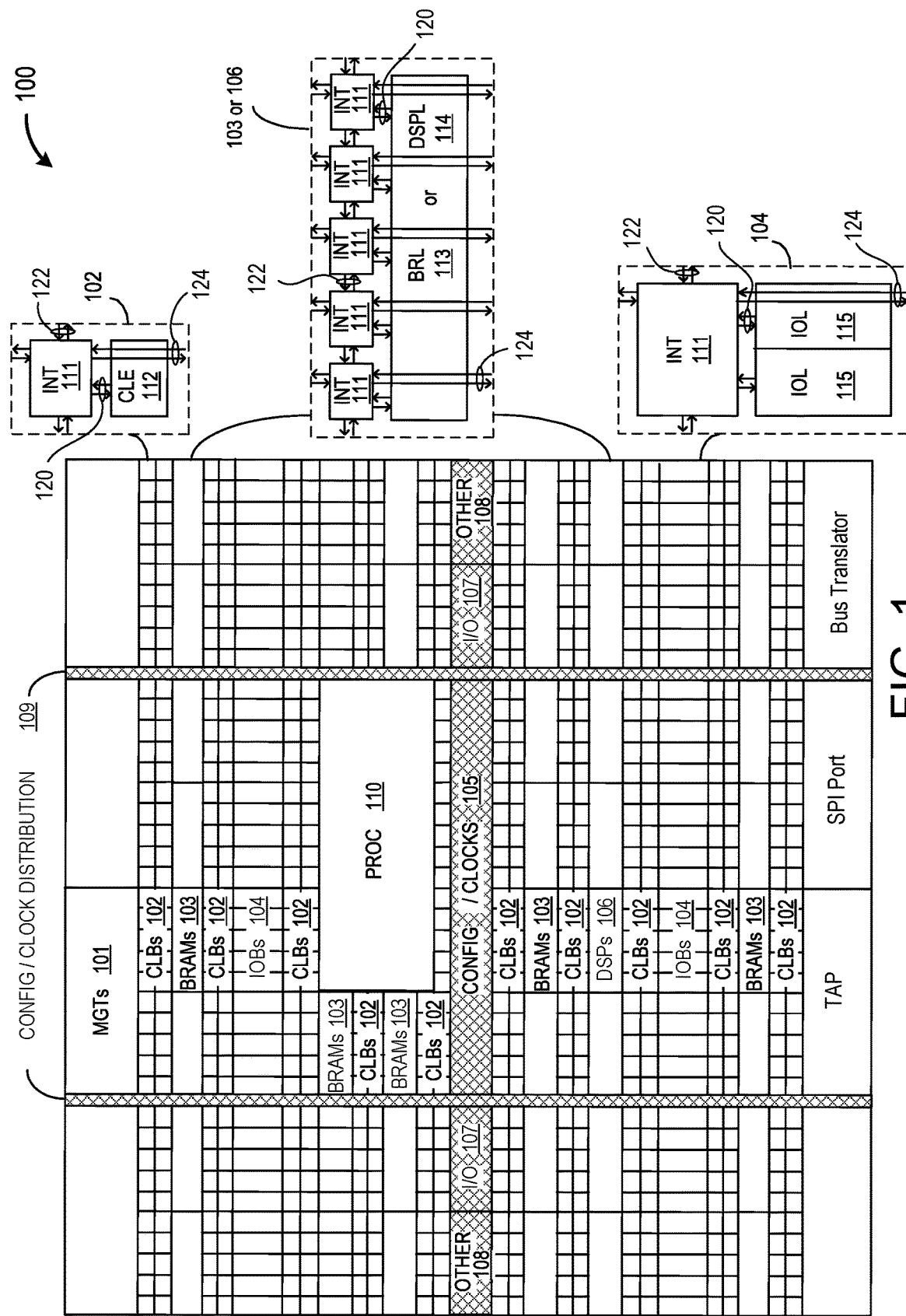
FIG. 1 depicts an exemplary programmable integrated circuit (IC) on which the disclosed circuits and processes may be implemented.

FIG. 1 depicts an exemplary programmable integrated circuit (IC) on which the disclosed circuits and processes may be implemented. A programmable IC 100 includes FPGA logic. The programmable IC 100 may be implemented with various programmable resources and may be referred to as a System on Chip (SOC). Various examples of FPGA logic may include several diverse types of programmable logic blocks in an array.

For example, FIG. 1 illustrates a programmable IC 100 that includes a large number of different programmable tiles including multi-gigabit transceivers (MGTs) 101, configurable logic blocks (CLBs) 102, blocks of random access memory (BRAMs) 103, input/output blocks (IOBs) 104, configuration and clocking logic (CONFIG/CLOCKS) 105, digital signal processing blocks (DSPs) 106, specialized input/output blocks (I/O) 107 (e.g., clock ports), and other programmable logic 108 (e.g., digital clock managers, analog-to-digital converters, system monitoring logic). The programmable IC 100 includes dedicated processor blocks (PROC) 110. The programmable IC 100 may include internal and external reconfiguration ports (not shown).

In various examples, a serializer/deserializer may be implemented using the MGTs 101. The MGTs 101 may include various data serializers and deserializers. Data serializers may include various multiplexer implementations. Data deserializers may include various demultiplexer implementations.

In some examples of FPGA logic, each programmable tile includes a programmable interconnect element (INT) 111 having standardized inter-connections 124 to and from a corresponding interconnect element in each adjacent tile. Therefore, the programmable interconnect elements taken together implement the programmable interconnect structure for the illustrated FPGA logic. The programmable interconnect element INT 111 includes the intra-connections 120 to and from the programmable logic element within the same tile, as shown by the examples included in FIG. 1. The programmable interconnect element INT 111 includes the inter-INT-connections 122 to and from the programmable interconnect element INT 111 within the same tile, as shown by the examples included in FIG. 1.

For example, a CLB 102 may include a configurable logic element (CLE) 112 that may be programmed to implement user logic, plus a single programmable interconnect element INT 111. A BRAM 103 may include a BRAM logic element (BRL) 113 and one or more programmable interconnect elements. In some examples, the number of interconnect elements included in a tile may depend on the height of the tile. In the pictured implementation, a BRAM tile has the same height as five CLBs, but other numbers (e.g., four) may also be used. A DSP tile 106 may include a DSP logic element (DSPL) 114 and one or more programmable interconnect elements. An IOB 104 may include, for example, two instances of an input/output logic element (IOL) 115 and one instance of the programmable interconnect element INT 111. The actual I/O bond pads connected, for example, to the I/O logic element 115, may be manufactured using metal layered above the various illustrated logic blocks, and may not be confined to the area of the input/output logic element 115.

In the pictured implementation, a columnar area near the center of the die (shown shaded in FIG. 1) is used for configuration, clock, and other control logic. Horizontal areas 109 extending from the column distribute the clocks and configuration signals across the breadth of the programmable IC 100. Note that the references to "columnar" and "horizontal" areas are relative to viewing the drawing in a portrait orientation.

Some programmable ICs utilizing the architecture illustrated in FIG. 1 may include additional logic blocks that disrupt the regular columnar structure making up a large part of the programmable IC. The additional logic blocks may be programmable blocks and/or dedicated logic. For example, the processor block PROC 110 shown in FIG. 1 spans several columns of CLBs 102 and BRAMs 103.

FIG. 1 illustrates an exemplary programmable IC architecture. The numbers of logic blocks in a column, the relative widths of the columns, the number and order of columns, the types of logic blocks included in the columns, the relative sizes of the logic blocks, and the interconnect/logic implementations are provided purely as examples. For example, in an actual programmable IC, more than one adjacent column of CLBs 102 may be included wherever the CLBs 102 appear, to facilitate the efficient implementation of user logic.

Programmable ICs may be deployed in a range of applications. The programmable logic capabilities of an FPGA may provide significant advantages in applications such as, for example, communications. By way of example, an FPGA may be programmed to process packet-based communications between networked devices. In some implementations, a network device may examine fields in packet headers to decide what to do with each packet. For example, a router may examine the internet protocol (IP) destination address to decide where to send the packet next. A firewall may compare several fields against an access-control list to decide whether to drop a packet. Parsing may include the process of identifying and extracting the appropriate header fields in a packet header. Deparsing may include the process of updating the appropriate header fields and reassembling the packet headers and data payload into an outgoing data packet. In various embodiments described herein, Field programmable gate arrays (FPGAs) may be used to implement a high-speed programmable packet processing.

Figure 2:
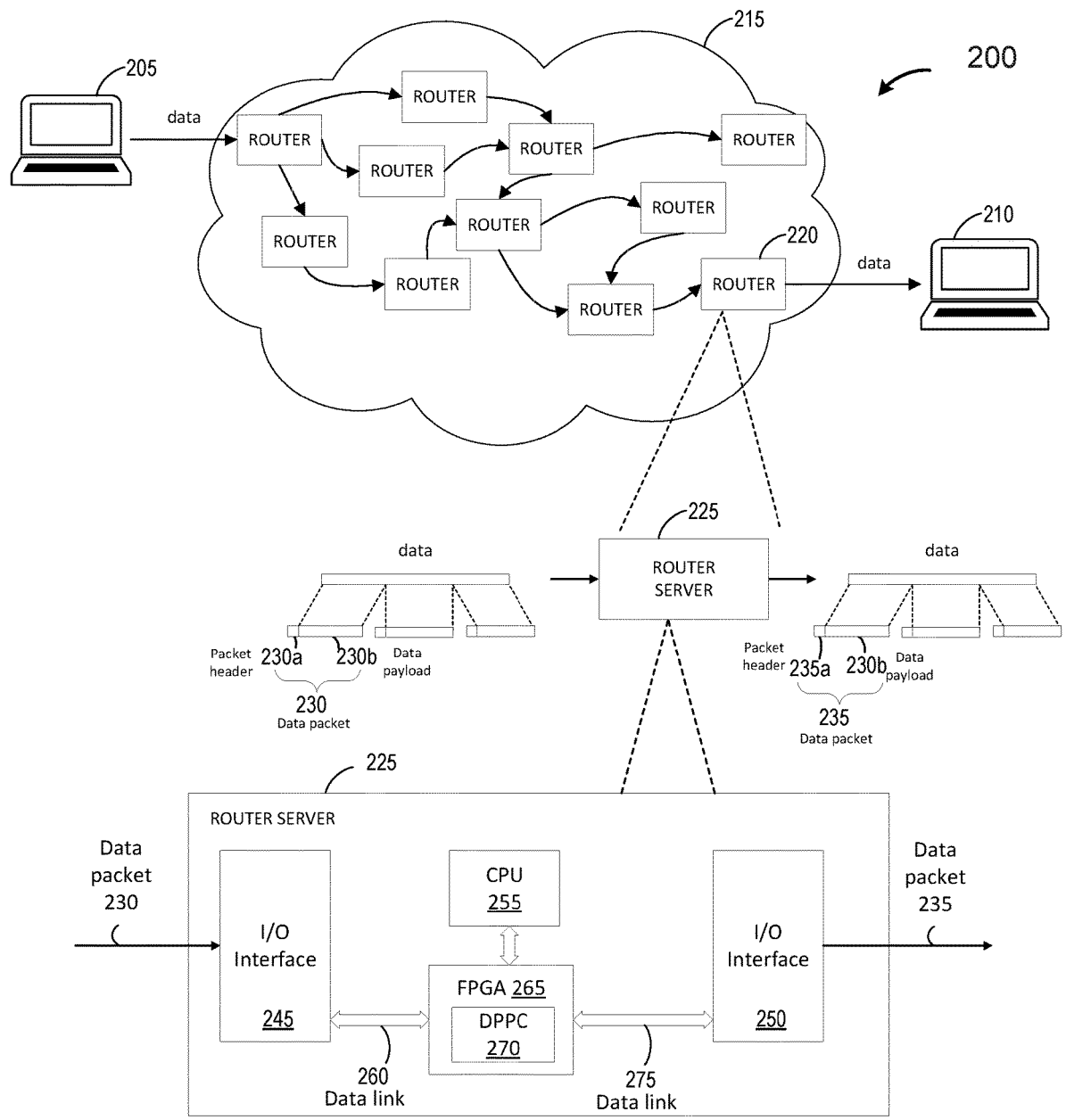
FIG. 2 depicts a router server implemented in a communication system accelerated by an exemplary data packet processing circuit (DPPC) implemented in a hardware streaming pipeline architecture with speculative header field extraction.

FIG. 2 depicts a router server implemented in a communication system accelerated by an exemplary data packet processing circuit (DPPC) implemented in a hardware streaming pipeline architecture with speculative header field extraction. In the depicted example of a communication system 200, when data transfers from a first telecommunication device 205 to a second telecommunication device 210, the data is forwarded by various routers in a network 215. Routers are used to forward data packets between computer network nodes. A router (e.g., router 220) may read information in the data packet to determine the next destination. Each router 220 includes a router server 225. The router server 225 may read network address information in the data packet to find the ultimate destination (e.g., the second telecommunication device 210). Data may be divided into data packets to be transferred between different routers. In this depicted example, data is divided into three data packets. Each data packet (e.g., data packet 230) includes a packet header 230*a* and a data payload 230*b*. The packet header 230*a* may be extracted and modified by the router server 225 to send to the next destination. For example, the packet header 230*a* is modified into a new packet header 235*a*. The new packet header 235*a* and the data payload 230*b* forms a new data packet 235.

The router server 225 includes a first I/O interface 245 coupled to receive the incoming data packet 230, and a second I/O interface 250 coupled to output the new data packet 235. The router server 225 further includes a central processing unit (CPU) 255, a data link 260 coupled to transfer data from the I/O interface 245 to an FPGA 265 configured with a data packet processing circuit (DPPC) 270, and a data link 275 coupled to transfer data from the FPGA 265 to the I/O interface 245. When the data packet 230 is transmitted to the router server 225, the router server 225 accepts the data packet 230 through the first I/O interface 245. The data packet 230 may then be detected by the CPU 255, which may monitor and/or provide control or auxiliary functions in support of the packet processing. In some example, the CPU 255 may offload the packet processing by instructing a field programmable gate array (FPGA) 265 to identify the data packet 230 and perform the processing operations that modify the header 230*a* into the header 235*a*. The data packet 230 is then allocated to the FPGA 265, which is configured with the data packet processing circuit (DPPC) 270. The DPPC 270 parses, processes, and deparses the data packet 230 and sends the processed data packet 235 to the second I/O interface 250 to the next destination.

Figure 3:
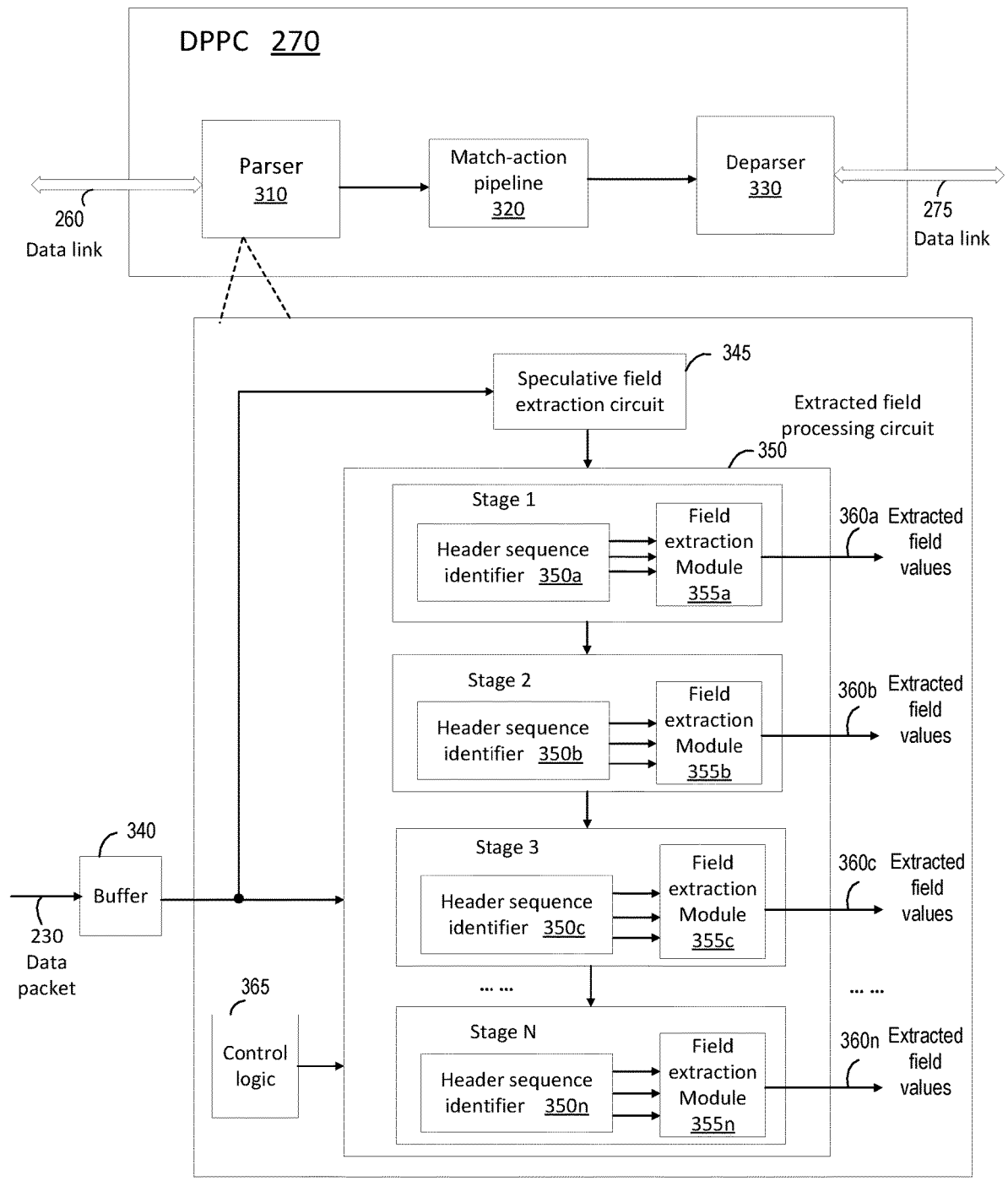
FIG. 3 depicts an exemplary DPPC implemented in an FPGA of the router server in FIG. 2.

FIG. 3 depicts an exemplary data packet processing circuit (DPPC) implemented in an FPGA of the router server in FIG. 2. A data packet processing circuit (DPPC) (e.g., the DPPC 270 in FIG. 2) includes a parser 310. The parser 310 may accept a data packet (e.g., the data packet 230) and extract header field information from the data packet, for example, using speculative field extraction.

The DPPC 270 also includes a match-action pipeline circuit 320. The match-action pipeline circuit 320 is configured to receive the extracted header field information, process, and modify headers and metadata.

The DPPC 270 also includes a deparser 330. The deparser 330 is configured to receive the modified headers and re-form the modified headers into the data packet (e.g., the data packet 230) to form a new outgoing data packet (e.g., the data packet 235).

In particular, the parser 310 is coupled to a buffer 340 that receives incoming data packets 230. The buffered data is passed to a speculative field extraction circuit (SFEC) 345 and to an extracted field processing circuit (EFPC) 350. The SFEC 345 may select predetermined fields corresponding to predetermined bit positions according to all possible header sequences in each of a sequence of parsing stages (or levels). This speculatively extracted field information, which may include length, offset or transition information fields, for example, is conveyed to corresponding pipelined stages of the EFPC 350. In various examples, the EFPC 350 may advantageously improve extraction efficiency and reduce latency in a hardware streaming pipeline for packet parsing.

The EFPC 350 includes, in the depicted example, Stages 1-n arranged in a pipeline to extract selected field values from header fields, which may be predetermined in accordance with the specification derived from high-level language (HLL) (e.g., P4) commands defined by the user. Respectively, each of the n stages includes a corresponding stage Header Sequence Identifier (HSID) circuit 350a, 350b, 350c, . . . 350n and a corresponding stage field extraction module (FEM) 355a, 355b, 355c, . . . 355n. The stage HSID circuits 350a-350n each select a correct one or more of the speculatively extracted fields, which may be received from the SFEC 345, to determine length, offset, and transition information that define the size, location and sequences of headers in the packet and fields of interest in the headers. After any stage HSID circuit has resolved the length, offset, and transition information for that stage, it passes that information to the next stage HSID circuit in the pipeline so that that next stage can determine its header length, offset, and transition information. In addition, each stage HSID 350a-350n passes its offset and transition information to its respective FEM 355a-355n, which aligns to the data packet appropriately to capture, respectively, the actual contents that represent vectors of extracted actual field values 360a, 360b, 360c, . . . 360n from the correct field locations (e.g., bit positions in the packet) that may have been specified, for example, in accordance with the HLL programming, for example. In some embodiments, the HSID 350a-n may cooperate with the FEM 355a-355n to extract required header field information that may be used in subsequent processing (e.g., in the Match-action Pipeline 320 and/or the deparser 330). Exemplary operations of the SFEC 345 and EFPC 350 are described in further detail with reference to FIGS. 7A-8. Exemplary operation of the FEM 355a-355n is described in further detail with reference to FIG. 9.

The parser 310 also includes a control logic circuit 365 coupled to the extracted field processing circuit 350 to coordinate, for example, control and timing signals within the parser 310.

Figure 4A:
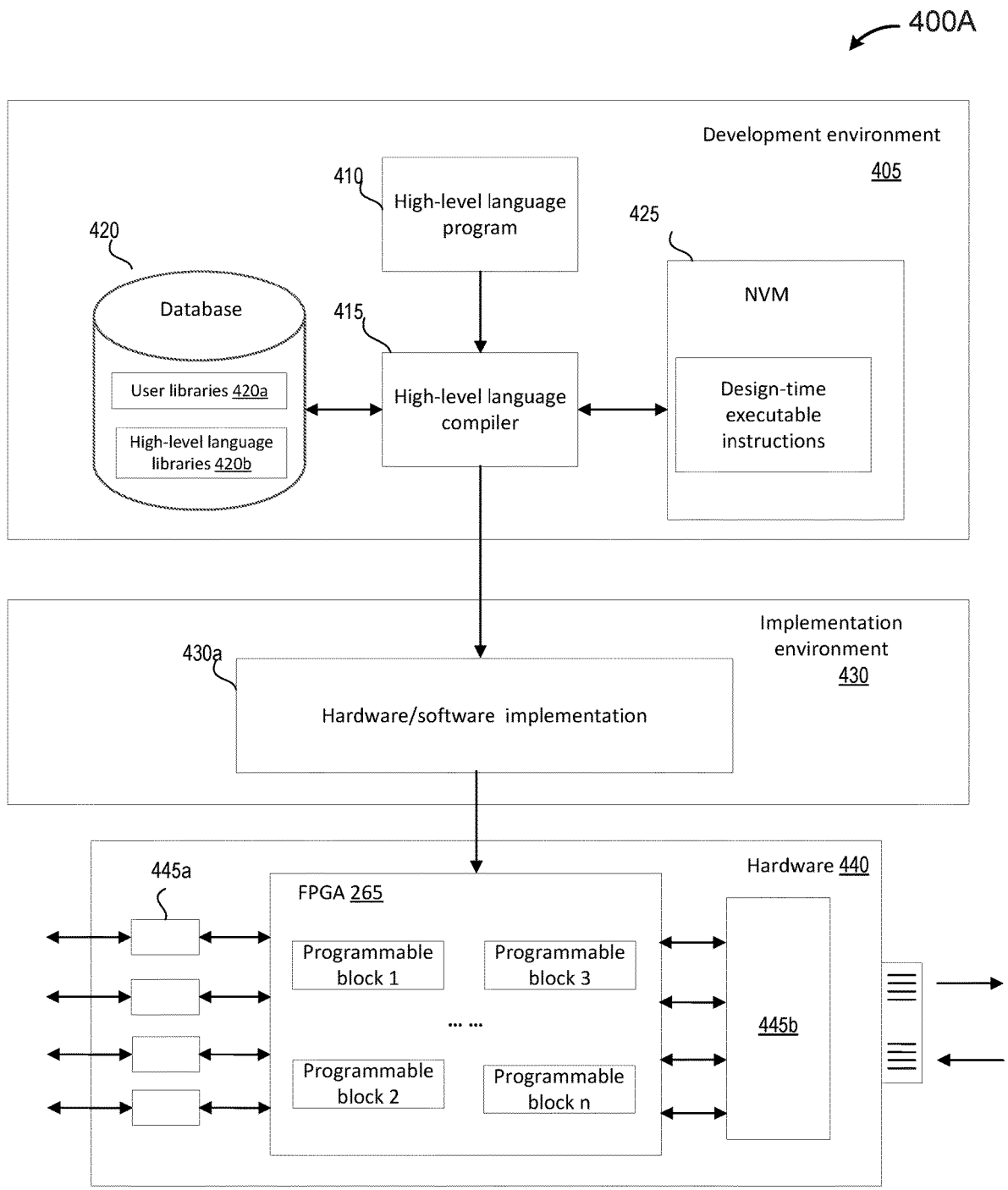
FIGS. 4A-4B each depict a block diagram of an exemplary system to use a high-level language representation to implement packet parsing in a hardware streaming pipeline architecture.
Figure 4B:
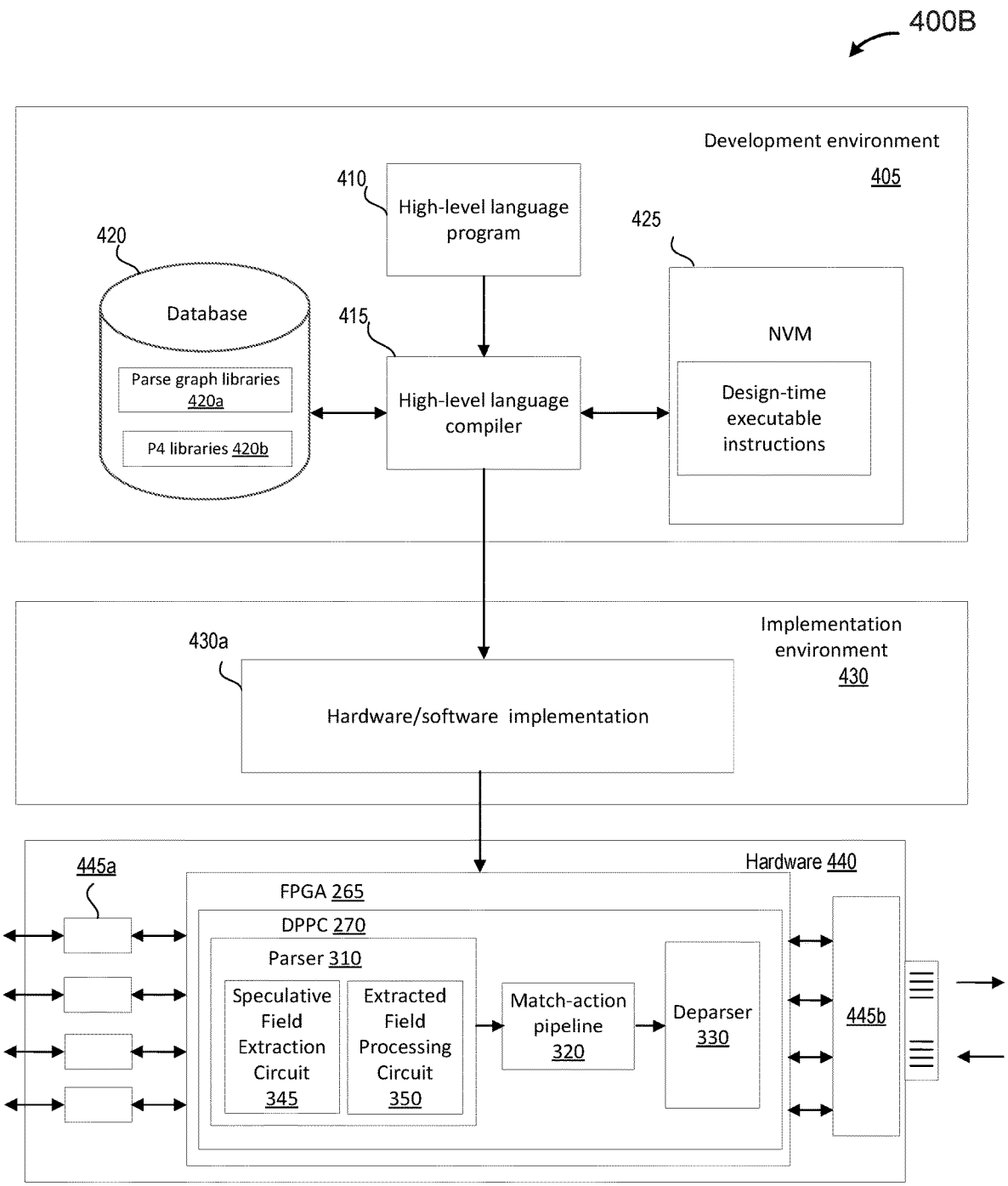

FIGS. 4A-4B each depict a block diagram of an exemplary system to use a high-level language representation to implement packet parsing in a hardware streaming pipeline architecture. Specifically, FIG. 4A depicts a generalized system to compile instructions in a high-level language (HLL) to configure, for example, any or all of n programmable logic blocks (1, 2, 3, . . . n). A configuration system 400A includes a development environment 405. A user may, via a user interface, use a HLL (e.g., P4 language) to generate, at design time, instructions that can produce, via RTL generation at compile time, a hardware pipeline architecture that, at run-time, can process a stream of packets using the FPGA 265. The development environment 405 also includes a HLL compiler 415. The HLL compiler 415 operatively connects with the HLL program 410 and a database 420. In this depicted example, the database 420 includes user libraries 420a and HLL libraries 420b. The HLL compiler 415 may select available library files in the database 420 to compile HLL commands into one or more sets of instructions, which may also be referred to as data structures. During development, the HLL compiler 415 may store the sets of instructions in a data store or NVM 425 (non-volatile memory).

The configuration system 400A also includes an implementation environment 430. An implementation engineer, for example, may employ some compiler tools to convert the instructions stored in the NVM 425 into hardware/software implementations 430a (e.g., RTL (register transfer logic)) that can be loaded via a bitstream, for example, into a target device such as the FPGA 265, for example. In some embodiments, the implementation environment 430 may generate the appropriate data files to realize fixed hardware (e.g., in an ASIC) in accordance with the design specified by, for example, the user-input high level language programming in the development environment 405.

The configuration system 400A also includes a hardware environment 440. The hardware environment 440 may include, for example, a line card. In some embodiments, the hardware environment 440 may include a network interface card (NIC). In this depicted example, the hardware environment 440 includes a number of buffers 445a (e.g., which may form the I/O interface 245) that connect external signals into an FPGA (e.g., the FPGA 265). In the depicted example, the FPGA 265 includes n programmable logic blocks that represent programmable hardware resources available to realize circuitry in accordance with the design specified by, for example, the user-input high level language programming in the development environment 405. The FPGA 265 also connects with other devices 445b which may provide a variety of auxiliary functions.

FIG. 4B depicts a particularized system configured to compile parsing instructions in a high-level language to configure programmable logic blocks for packet parsing using speculative field extraction. In various embodiments, high-level language may provide high-level (e.g., similar to human language) way of describing formats or sequences of packet headers and rules for parsing these headers. The user may use a HLL at design time to specify header structures that may be used to predetermine a parse graph, an example of which is described in further detail with reference to FIG. 6. A user may use a HLL (e.g., P4 language) to generate, at design time, instructions that can produce, via RTL generation at compile time, a hardware pipeline architecture that, at run-time, can efficiently parse a stream of packets using the FPGA 255. In this depicted example, the database 420 includes one or more parse graph libraries in the user libraries 420a, and one or more P4 libraries in the HLL libraries 420b.

When the parse graph is determined, an optimal number of parsing stages may be determined based on the longest header sequence in the parse graph. The HLL compiler 415 may execute a program of instructions to generate the set of instructions (e.g., data structures) that, when compiled in the implementation environment 430, may be used to reconfigure hardware resources in the FPGA 265 to form a streaming hardware pipeline structure, including the DPPC 270, which may be configured to parse data packets using speculative field extraction as described herein. Exemplary process flow steps that may be performed at design time and compile time are described in further detail, for example, with reference to FIG. 5A.

The instructions to reconfigure hardware resources may be stored in the NVM 425. A compiler system in the implementation environment 430 may process the instructions and may generate a bitstream (e.g., RTL register transfer logic) to reconfigure programmable logic of the FPGA 255 to implement the pipeline-structure DPPC 270 based on the compiled instructions. Accordingly, in addition to match-action and deparsing functions, the DPPC 270 may then be available to efficiently parse data packets using speculative header field extraction at run-time.

In this depicted example, the DPPC 270 includes the parser 310, the match-action pipeline 320, and the deparser 330. The parser 310 includes the SFEC 345, and the EFPC 350, which includes the HSIDs 350a-n and the FEM 355a-n.

Figure 5A:
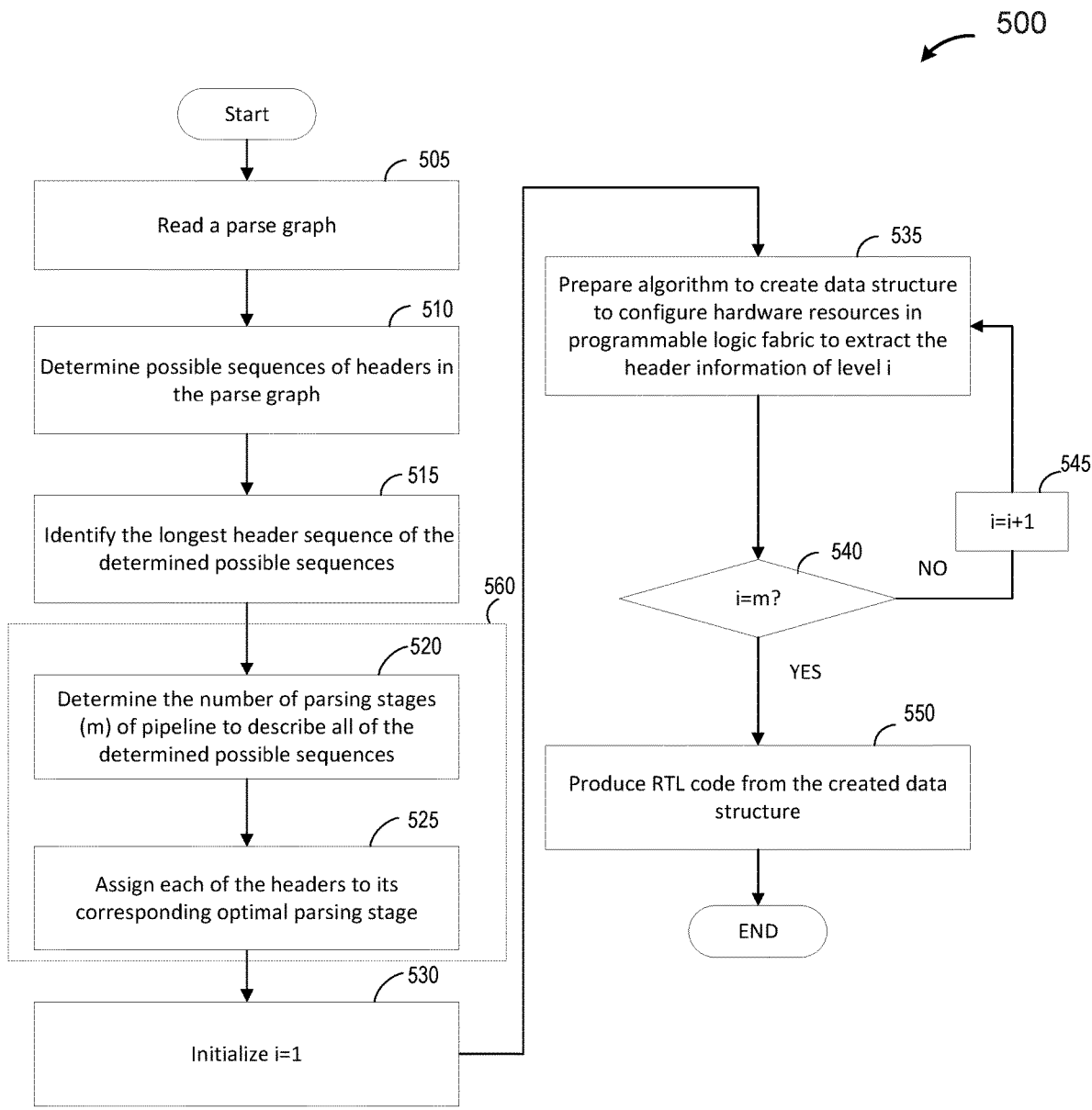
FIG. 5A depicts a flow chart of a process, performed prior to RTL generation, to implement an exemplary hardware streaming pipeline architecture.
Figure 6:
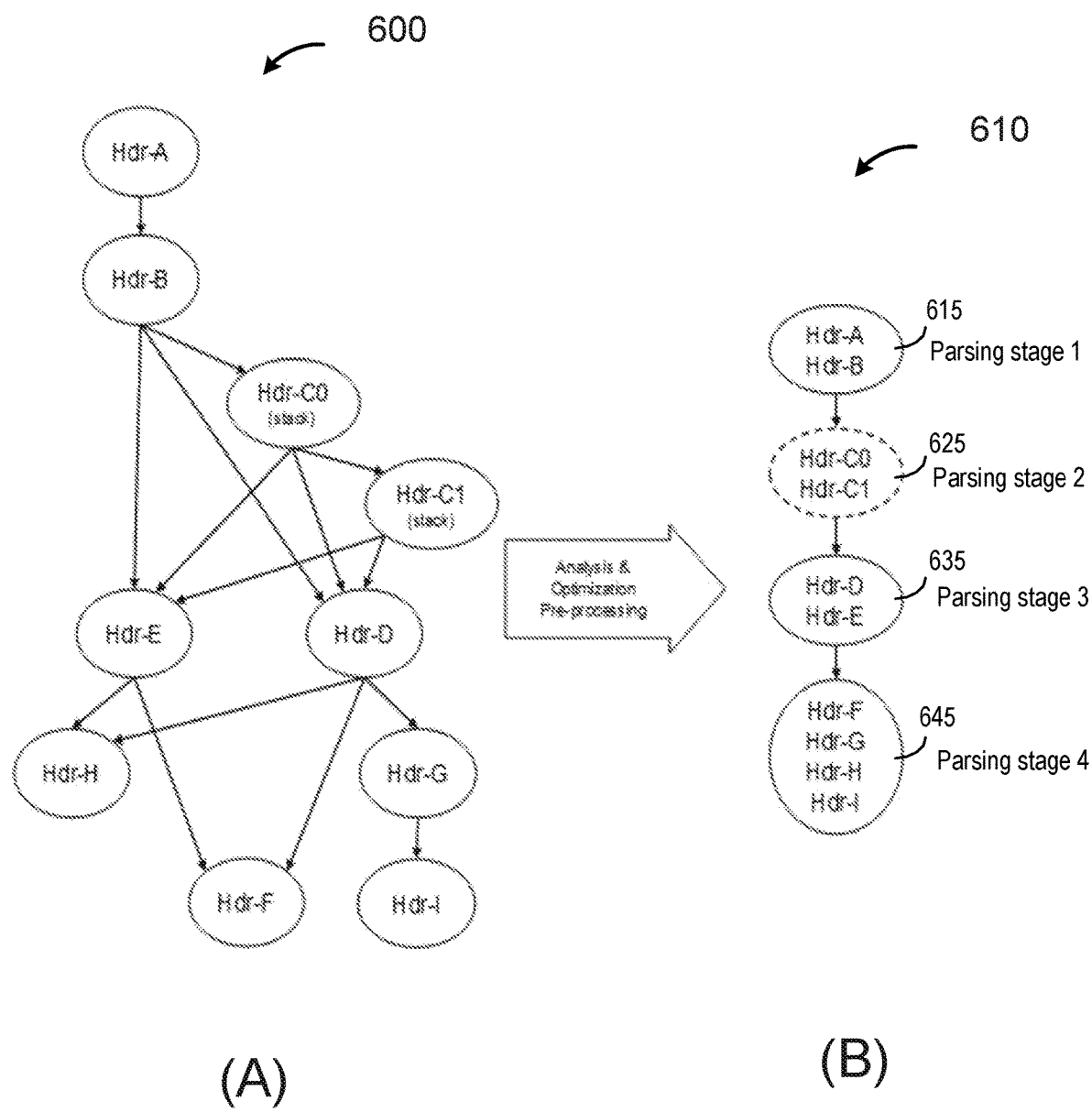
FIG. 6 depicts an exemplary parse graph mapped into parsing stages based on a high-level language description of a parsing state machine.

FIG. 5A depicts a flow chart of a process, performed prior to RTL generation, to implement an exemplary hardware streaming pipeline architecture.

A method 500, which may be performed at design time by the configuration system 400A, includes, at 505, reading a parse graph for any possible data packets, such as the data packet 230, that may be received at run-time for processing by the DPPC 270. For example, when the DPPC 270 may be used for a data center, the user may specify a first kind of parse graph via a high-level description language (e.g., P4 language). When the DPPC 270 is used for a service provider, the user may specify another type of parse graph (e.g., custom parse graph tailored for the user's application). The method also includes, at 510, determining possible sequences of headers in the parse graph. An example to determine possible sequences are further described in FIG. 6.

At 515, the longest header sequence of the determined possible sequences is identified. Based on the longest header sequence, at 520, the number of pipeline parsing stages m to describe all the determined possible sequences are obtained. For example, four pipeline parsing stages may be determined. At 525, based on possible header lengths and dependencies between headers and fields, headers are assigned to an optimal parsing stage. One or more headers may be assigned to the same parsing stage. An exemplary method, in accordance with various embodiments, that may be used to determine an optimal pipeline of stages from a parse graph that defines possible header sequences is further described with reference to FIG. 5B.

At 530, the HLL compiler 415 may perform operations to initialize an index variable i to an initial value 1. At 535, the compiler 415 may perform further operations to prepare an algorithm to create one or more data structures to configure hardware resources (e.g., in an FPGA, or ASIC, for example) to extract the header information of stage i. At 540, if i is not equal to m such that not all of the parsing stages have data structures to configure a corresponding parsing circuit, then at 545, the compiler system 415 increments the variable i and 535 is repeated. If i=m such that each of the parsing stages has data structures to configure a corresponding parsing circuit, then at 550, the development environment software may operate to initiate compilation of the created data structures in the implementation environment 430, so that register transfer level (RTL) code may be produced at 550.

Figure 5B:
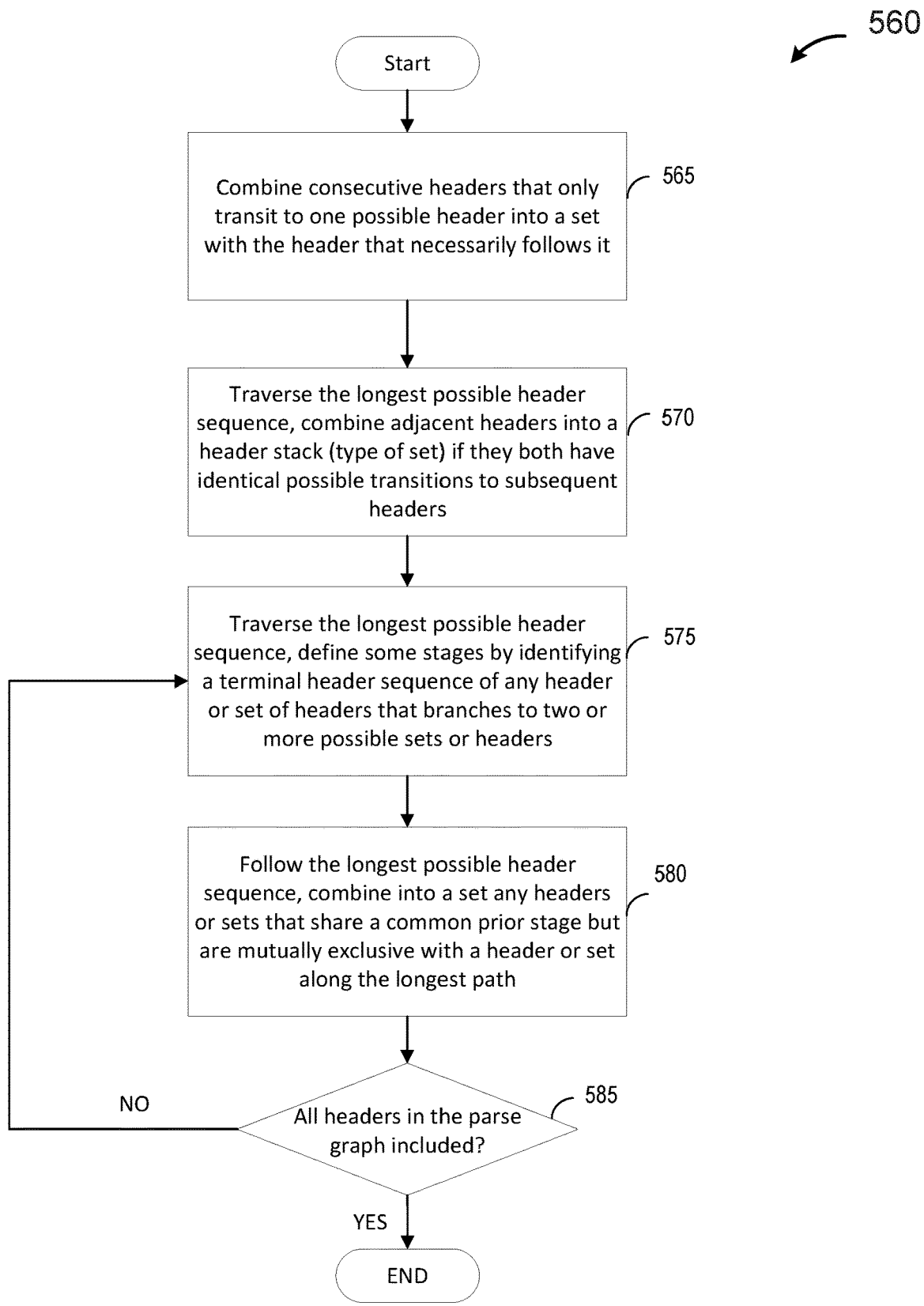
FIG. 5B depicts a flow chart of an exemplary method to generate the pipeline stage from a parse graph model.

FIG. 5B depicts a flow chart of an exemplary method to generate the pipeline stage from a parse graph model. In the depicted example, a method 560 may be performed by, for example, the compiler 415. Specifically, in this example, the method 560 includes steps that may be performed around 520, 525 in the method 500 of FIG. 5A. In the method 560, the compiler 415 combines, at 565, consecutive headers that may only transit to one possible header, whereby the combination produces a set with the header that necessarily follows it (e.g., headers A, B form a set, and headers G, I form a set in FIG. 6). At 570, the compiler 415 traverses the longest possible header sequence (e.g., the longest possible header sequence is from header A to B, C0, C1, D, G, and I), and combines adjacent headers into a header stack (type of set) if they both have identical possible transitions to subsequent headers (e.g., C0, C1). At 575, the compiler 415 traverses the longest possible path and defines some stages by identifying a terminal header sequence of any header or set of headers that branches to two or more possible sets or headers. At 580, following the longest possible path, the compiler 415 combines into a set any headers or sets that share a common prior stage but are mutually exclusive with a header or set along the longest path. At 585, the compiler 415 decides whether all headers in the parse graph are already assigned to a stage or level in the pipeline. If less than all of the headers of interest have been assigned to a stage in the pipeline, then the compiler 415 loops back to 575. If than all of the headers of interest have been assigned to a stage in the pipeline, then the pipeline stage with optimal parsing stages is formed and the method 560 ends.

FIG. 6 depicts an exemplary parse graph mapped into parsing stages based on a high-level language description of a parsing state machine. The user may predetermine a parse graph at design time, for example. By implementing the method 500 and 560 described in FIG. 5A and FIG. 5B, the parse graph 600 may be transferred into a pipeline stage 610.

An exemplary parse graph 600 is shown in FIG. 6. The parse graph 600 includes header A, header B, header C0, header C1, header D, header E, header F, header G, header H, and header I. Possible header sequences are shown by arrows. For example, a possible header sequence is from header A to header B to header E to header F. Another possible header sequence is from header A to header B to header C0 to header D to header G to header I. In various examples, a parsing stage may contain one or more headers. The headers in one parsing stage may be mutually exclusive (e.g., header D and header E may not both appear in one data packet). The headers in one parsing stage may be in a sequential order (e.g., header B always follows header A in the parse graph of FIG. 6). Some headers in one parsing stage (e.g., a fourth parsing stage 645 in FIG. 6) may be mutually exclusive and some headers may be in a sequential order.

In this depicted example, the pipeline stage 610 includes four parsing stages. Based on dependencies between headers and fields, headers are assigned to an optimal parsing stage. In this depicted example, header A and header B are assigned to a first parsing stage 615, header C0 and header C1 are assigned to a second parsing stage 625, header D and header E are assigned to a third parsing stage 635, and header F, header G, header H and header I are assigned to a fourth parsing stage 645. On each of these levels, headers may be processed and required field values may be extracted. More specifically, the pipeline stage 610 illustrates the number of parsing stages used to implement header parsing for the specified example, and the associated headers to be processed in each stage. The transitions between parsing stages are defined by the transition arrows that define possible header sequences in the parse graph 600. The process may be executed from stage 1 to stage 4, even if the associated headers are not present in the packet.

Figure 7A:
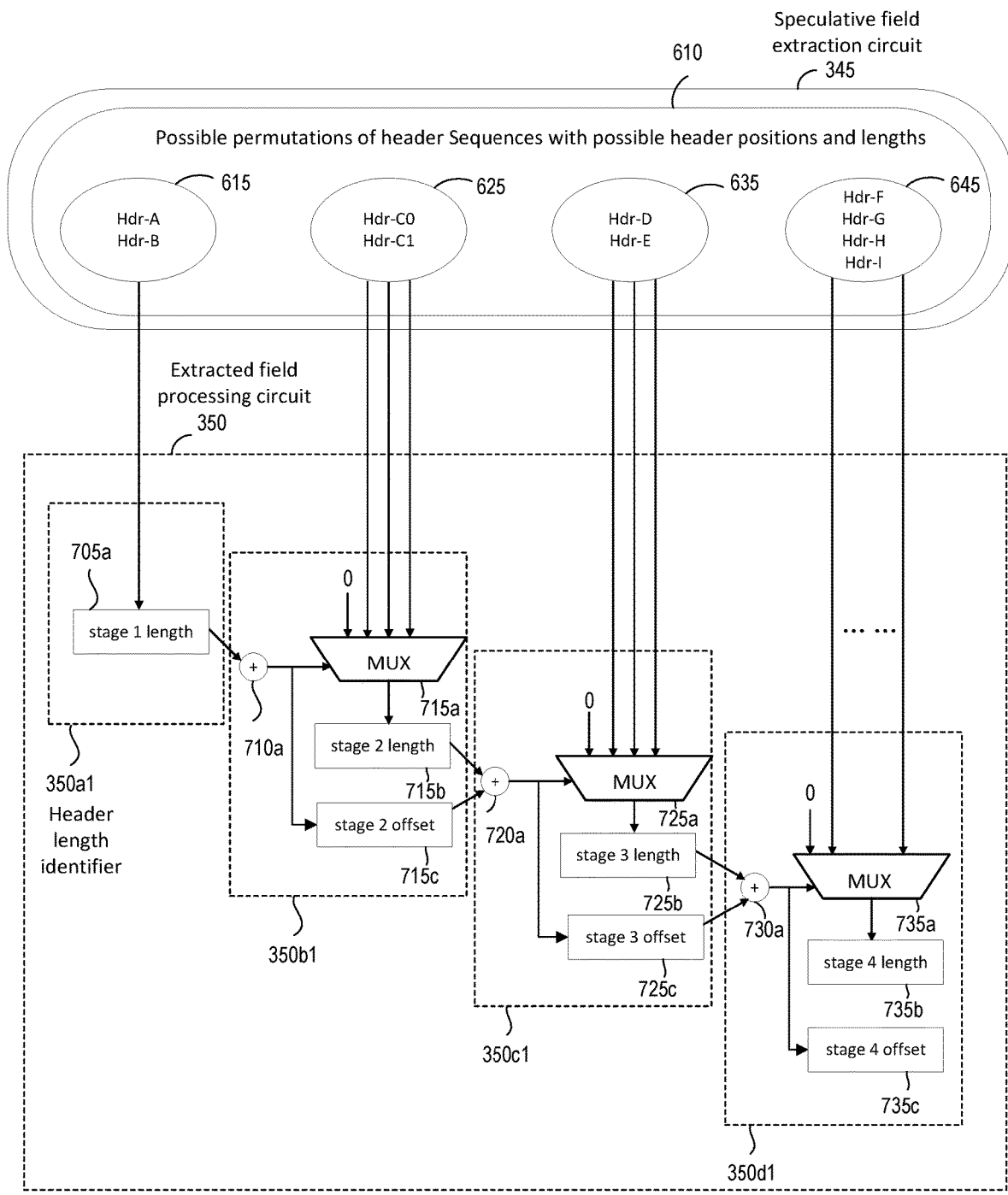
FIG. 7A depicts a block diagram representation of an exemplary pipeline configured to determine length and offset from packet headers using speculative field extraction.

FIG. 7A depicts a block diagram representation of an exemplary pipeline configured to determine length and offset information from packet headers using speculative field extraction. As discussed with reference to FIG. 6, the exemplary pipeline stage 610 includes four parsing stages (parsing stage 615, 625, 635, 645). The parsing stages 615, 625, 635, 645 are processed by circuitry configured to speculatively extract the incoming packets to determine the incoming header sequence and header lengths. All possible permutations of headers and all possible positions where different headers may appear in a data packet are predetermined (e.g., predefined in the parse graph libraries 420a in the database 420). In various implementations, possible positions (e.g., bit location) of a header within a packet (or field within a header) may be a function of the header sequence and the length of each header. By way of example and not limitation, the SFEC 345 associated with each of the stages 615, 625, 635, 645 may include a hardware register circuit aligned with the bit positions that contain the length field information for each possible header sequence of interest.

In the depicted example, the SFEC 345 associated with each of the stages 615, 625, 635, passes speculatively extracted length field information signals to the corresponding header length identifier (HLID) circuits 350a1-350d1.

The HLID circuits 350a1-d1 are configured to produce length and offset information for each stage. The correct length information may be selected by a selector circuit (e.g., MUX) 715a, 725a, 735a in each of the HLIDs 350b1-d1 from the second stage to the fourth stage in response to offset information received from the prior adjacent stage. In the HLID circuit 350a1, the length information from the stage 615 may be directly read since the initial bit position information may be known by default.

For illustrative purposes using a simplified example in which all of the headers have a fixed length, in the parse graph 600, header A, header B, header C0, and header C1 would have only one possible position. Header E would have three possible positions because header transition may be from header A to header B to header E, from header A to header B to header C0 to header E, or from header A to header B to header C0 to header C1 to header E. Similarly, header D has three possible places and header F, H, G, I each has one possible place. In other examples in which headers may have different or multiple potential lengths (e.g., if Header D or E have 10 possible lengths), then headers F, G, H may appear as positioned in more than one place in the packet. All possible header length information, transition information, and offset information may be stored in registers.

The EFPC 350 includes four increasingly significant header length identifier (HLID) circuits 350a1, 350b1, 350c1, 350d1, each of which is correspondingly configured to read speculative values from each of the four parsing stages, respectively. Each of the HLID circuits may include one or more sub identifier circuits. For example, the header length identifier 350c1 is configured to read header length information of the third parsing stage 635 as selected by the MUX 725a. The third parsing stage 635 contains information relating to both header D and header E. The HLID 350c1 may be designed to have two sub header length identifier. A first sub header length identifier 350c1 may be configured to read length information relating to header D and a second sub header length identifier may be configured to read length information relating to header E.

Each of the HLID circuits is more significant than the previous header length identifier, with HLID 350a1 being the least significant. The HLID 350b1, 350c1, 350d1, respectively, include an adder 710a, 720a, 730a, a selector circuit (e.g., MUX) 715a, 725a, 735a, a stage length circuit (e.g., registers) 715b, 725b, 735b, and a stage offset circuit (e.g., registers) 715c, 725c, 735c. The stage length circuits 715b, 725b, 735b are each configured to store header length information selected from among the possible values in the corresponding stage by the corresponding MUX. The stage offset circuits 715c, 725c, 735c are each configured to store an offset information of the corresponding parsing stage. The header length circuit contains a value representing the number of bits necessary to shift in order to correctly align to the header field of interest (e.g., the length field) within the correct header. Examples of circuitry to implement such an alignment so that the actual length field value can be extracted are described with reference to FIG. 9.

In operation of various embodiments, the adder circuits 710a, 720a, 730a in each of the HLID 350b1, 350c1, 350d1 may receive the offset and the length information from the adjacent less significant parsing stage circuit (except that the first stage may not output an offset signal), as in the depicted example. The selector circuit of each stage may select the correct one of the speculatively generated possible field lengths from the respective parsing stages, and may pass the selected information to be held in the corresponding stage length circuit. The adder output signal controls the respective selector circuit, and the value of the control signal is stored in the stage offset circuit. The adder circuit combines (e.g., sums or the logical equivalent) stage length circuit value and the stage offset circuit value it receives from the adjacent lesser significant stage. The first header length identifier 350a1 reads possible header length fields in the first parsing stage 615. In this depicted example, according to the parse graph, all data packets in the first parsing stage 615 include both header A and header B, and header A is followed by header B. Therefore, the first header length identifier 350a1 reads only one place from the first parsing stage 615. Each of the $2^{nd}$, $3^{rd}$, $4^{th}$ header length identifier includes a selector circuit, depicted in this example as a multiplexer 715a, 725a, 735a configured to read n possible header length information from corresponding parsing stage of the $2^{nd}$, $3^{rd}$ or $4^{th}$ parsing stages, n is the number of possible header positions. The multiplexer in each of the $2^{nd}$, $3^{rd}$ and $4^{th}$ header length identifiers is selected to choose, in a cascaded and pipelined manner, which of the speculatively extracted values from, respectively, the parsing stages 625, 635, 645, is the correct value. The selected correct value may include an actual header field length information 715b, 725b, 735b in response to a header field information and a header offset information 715c, 725c, 735c obtained from an adjacent less-significant parsing stage circuit 705, 715, 725.

When a data packet comes in, the EFPC 350 directly reads field length information in the header. The output of the first header length identifier 350a1 indicates the second header length identifier 350b1, the length information and offset information of a next header. In an illustrative example, if the received packet has no C0 or C1 header, the second parsing stage 625 may be resolved to have zero length. Accordingly, the stage 2 offset 715c would pass through to the adder 720a the same positional value it received at its input from the adder 710a.

For the third header length identifier 350c1, the third header length identifier 350c1 is configured to output the header length (e.g., header D length information) of the third parsing stage 635. Another copy of the third header length identifier 350c1 to output the header length (e.g., header E length information) of the third parsing stage 635 is not shown in this figure. The third header length identifier 350c1 includes a second adder 720b configured to receive outputs from the second header length identifier 350b1. The third header length identifier 350c1 also includes the multiplexer 725a configured to receive possible positions of the header (e.g., header D) length of the third parsing stage 635 and output a real position of the header length. The real position of the header length of the third parsing stage 635 is selected by the output of the adder 720a.

For example, if we want to extract header D's length, as header D may appear in three different positions, header D's length information may also appear in three different positions. The third header length identifier 350c1 may be configured to select from among three possible values extracted from the third parsing stage 635. The three possible values are received by the multiplexer 725a. The output (the header length information stored 715b and offset information stored 715c in the second parsing stage 625) of the second header length identifier 350b1 are calculated by the second adder 720a, and the summed result indicates next header's length information and corresponding offset information. The multiplexer 725a selects the relevant fields from the packet that can then be used to determine the header sequence and header lengths. For example, a protocol (e.g., IPv4) may have a field called "header length," which can have values from 5 to 15, which expresses the length of the IPv4 header in 32-bit steps. If, for example, header F is indeed an IPv4 header, and present in the packet, with a "header length" value of 7, an output vector from the field extraction module 355d in stage 4 length would be 224, representing an actual positional length value of 224 bits.

For the fourth parsing stage 645, the fourth header length identifier 350d1 is configured to output the header length information of the fourth parsing stage 645. The fourth header length identifier 350d1 includes a third adder 730a configured to receive outputs from the third header length identifier 350c1. The fourth header length identifier 350d1 also includes the multiplexer 735a configured to select from among speculative outputs of the header length from the fourth parsing stage 645, and to output an actual length information in bits of the header. The actual length of the header of the fourth parsing stage 645 is selected by the output of the adder 730a.

Figure 7B:
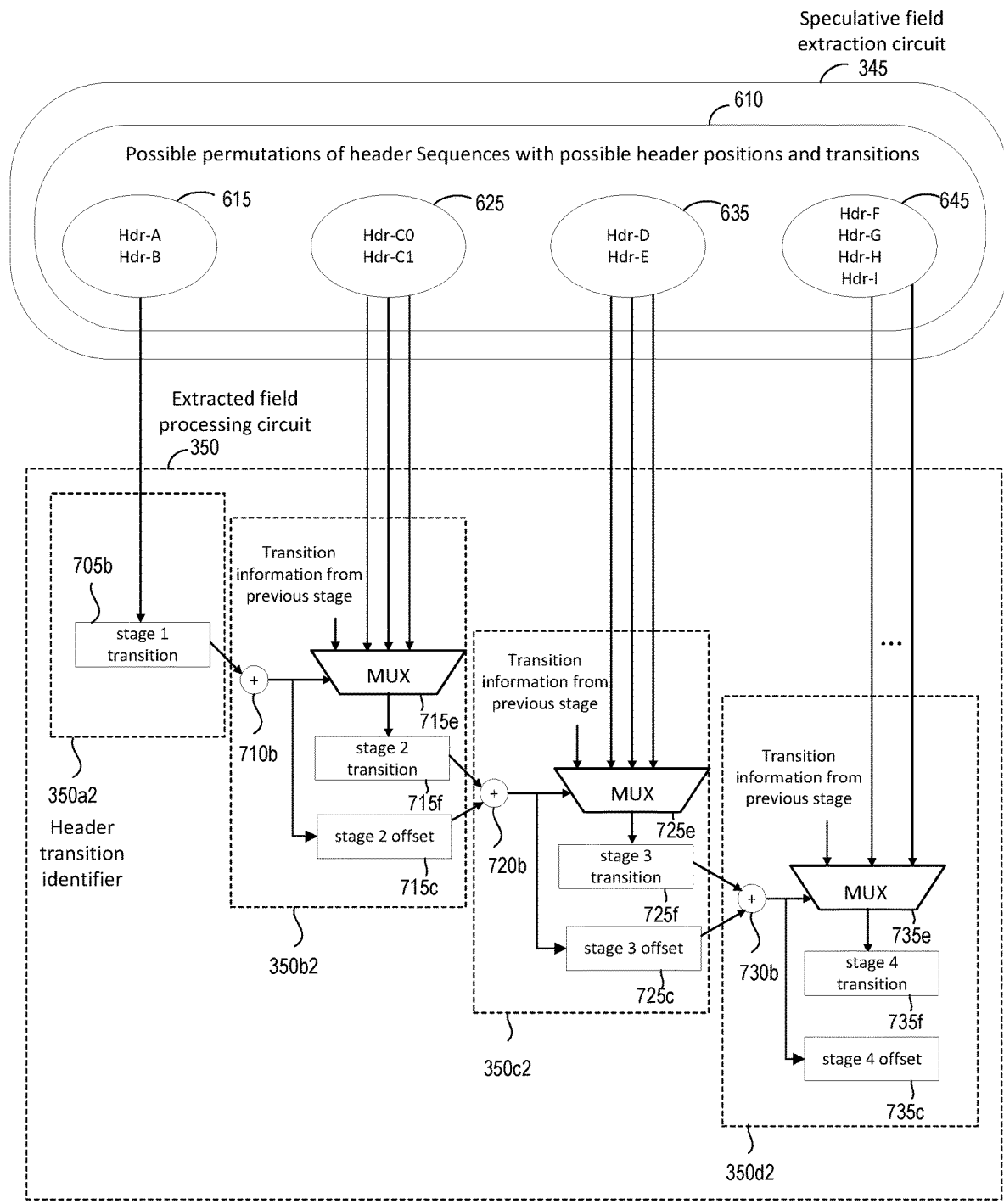
FIG. 7B depicts a block diagram representation of an exemplary pipeline configured to determine a header transition information from packet headers using speculative field extraction.

FIG. 7B depicts a block diagram representation of an exemplary pipeline configured to determine a header transition information from packet headers using speculative field extraction. In the depicted example, each of the stages 615, 625, 635, 645 passes speculatively extracted transition field information signals to the corresponding header transition identifier (HTID) circuits 350a2, 350c2, 350d2.

HTID circuits 350a2-d2 are configured to operate similarly to the HLID circuits 350a1-350d1 to produce transition information for each stage rather than length and offset information. The correct transition information may be selected by a selector circuit (e.g., MUX) 715e, 725e, 735e in each of the HTIDs 350b2-d2. In the HLID circuit 350a1, the length information from the stage 615 may be directly read since the initial bit position information may be known by default. If, for example, header C0 or header C1 is not present in the packet, then the transition from stage 1 may be carried through to stage 3.

By way of example and not limitation, the SFEC 345 associated with each of the stages 615, 625, 635, 645 may include a hardware register circuit aligned with the bit positions that contain the transition field information for each possible header sequence of interest. For each pipeline stage, each of the speculatively extracted transition field information signals that correspond to every possible header sequence of interest is passed to the corresponding HTID 350a2-d2 of the EFPC 350.

The EFPC 350 also includes four increasingly significant header transition identifiers 350a2, 350b2, 350c2, 350d2, each of which is correspondingly configured to read speculative values from each of the four parsing stages, respectively. Each header transition identifier may include one or more sub identifier circuits. For example, header transition identifier 350c2 is configured to read header transition information of the third parsing stage 635. The third parsing stage 635 contains information relating to both header D and header E. The header transition identifiers 350c2 may be designed to have two sub header transition identifiers. A first sub header transition identifier 350c2 may be configured to read transition information relating to header D and a second sub header transition identifier may be configured to read transition information relating to header E.

Each of the header transition identifiers is more significant than the previous header transition identifier, with header transition identifier 350a2 being the least significant. The header transition identifier 350b2, 350c2, 350d2, respectively, include an adder 710b, 720b, 730b, a selector circuit (e.g., MUX) 715e, 725e, 735e, a stage transition circuit (e.g., registers) 715f, 725f, 735f configured to store a header length information of the corresponding parsing stage, and the stage offset circuit (e.g., registers) 715c, 725c, 735c configured to store the offset information of the corresponding parsing stage. The stage transition circuit contains a value representing the number of bits necessary to shift in order to correctly align to the header field of interest (e.g., the transition field) within the correct header. Examples of circuitry to implement such an alignment so that the actual length field value can be extracted are described in further detail with reference to FIG. 9.

In operation, the adder circuits 710a, 720a, 720a, 730a, 710b, 720b, 730b in each stage receive the offset information and the transition information from the adjacent less significant parsing stage circuit (except that the first stage may not output an offset signal), as in the depicted example. The selector circuit of each stage selects the correct one of the speculatively generated possible field transitions from the respective parsing stages, and passes the selected value to be held in a stage transition circuit 705b, 715f, 725f, 735f. The adder output signal controls the respective selector circuit, and the value of the control signal is stored in the stage offset circuit. The adder circuit combines (e.g., sums or the logical equivalent) stage transition circuit value and the stage offset circuit value it receives from the adjacent lesser significant stage.

In an illustrative example, the first header transition identifier 350a2 may read possible header transition fields in the first parsing stage 615. In this depicted example, according to the parse graph, all data packets in the first parsing stage 615 include both header A and header B, and header A is followed by header B. Therefore, the first header length identifier 350a1 reads only one place from the first parsing stage 615. Each of the $2^{nd}$, $3^{rd}$, $4^{th}$ HTID circuits includes a selector circuit, depicted in this example as a multiplexer 715a, 725a, 735a configured to read n possible header transition information from corresponding parsing stages of the $2^{nd}$, $3^{rd}$ or $4^{th}$ parsing stages, where n is the number of possible header transitions. The multiplexer in each of the $2^{nd}$, $3^{rd}$ and $4^{th}$ header transition identifiers is configured to select, in a cascaded and pipelined manner, which of the speculatively extracted values from, respectively, the parsing stages 625, 635, 645, is the correct value. The selected correct value may include an actual header field transition information 715b, 725b, 735b in response to a header field information and a header offset information 715c, 725c, 735c obtained from an adjacent less-significant parsing stage circuit 705, 715, 725.

When a data packet comes in, the EFPC 350 directly reads an actual field transition information in the header. The output of the first header transition identifier 350a2 indicates the second header transition identifier 350b2, the transition information and offset information of the next header. In an illustrative example, if the received packet has no C0 or C1 header, the second parsing stage 625 may be resolved to output the transition information from a previous stage (e.g., the first parsing stage 615). Accordingly, the stage 2 offset 715c would pass through to the adder 720b the same positional value it received at its input from the adder 710b. If header C0 or header C1 is not present in the packet, then the transition from parsing stage 1 may be carried through to parsing stage 3.

For the third header transition identifier 350c2, the third header transition identifier 350c2 is configured to output the header transition (e.g., header D transition information) of the third parsing stage 635. Another copy of the third header transition identifier 350c2 to output the header transition (e.g., header E transition information) of the third parsing stage 635 is not shown in this figure. The third header transition identifier 350c2 includes the adder 720b configured to receive outputs from the second header transition identifier 350b2. The third header transition identifier 350c2 also includes the multiplexer 725a configured to receive possible positions of the header (e.g., header D) transition of the third parsing stage 635 and output information about a position of the corresponding header transition. The actual position of the header transition of the third parsing stage 635 is selected from among the speculatively generated possible choices by the output of the adder 720b.

For example, if we want to extract header D's transition information, as header D may appear in three different positions, header D's transition information may also appear in three different positions. The third header transition identifier 350c2 may be configured to select from among three possible values extracted from the third parsing stage 635. The three possible values are received by the multiplexer 725a. The output (the header transition information stored 715f and offset information stored 715c in the second parsing stage 625) of the second header transition identifier 350b2 is calculated by the adder 720b, and the summed result indicates next header's transition information and corresponding offset information. The multiplexer 725b selects the relevant fields from the packet that can then be used to determine the header sequence.

For the fourth parsing stage 645, the fourth header transition identifier 350d2 is configured to output the header transition information of the fourth parsing stage 645. The fourth header transition identifier 350d2 includes an adder 730b configured to receive outputs from the third header transition identifier 350c2. The fourth header transition identifier 350d2 also includes the multiplexer 735a configured to select from among speculative outputs of the header transition from the fourth parsing stage 645, and to output an actual transition information in bits of the header. The actual transition of the header of the fourth parsing stage 645 is selected by the output of the adder 730b.

In the event that any one of the stages 615, 625, 635, 645 has zero length, a default value of 0 length is selected as the input to the multiplexer 715a, 725a, 735a. In the event that any one of the stages 615, 625, 635, 645 has zero length, a default value of the transition information from the previous (e.g., next less significant) stage is selected as the input to the multiplexer 715e, 725e, 735e.

Figure 8:
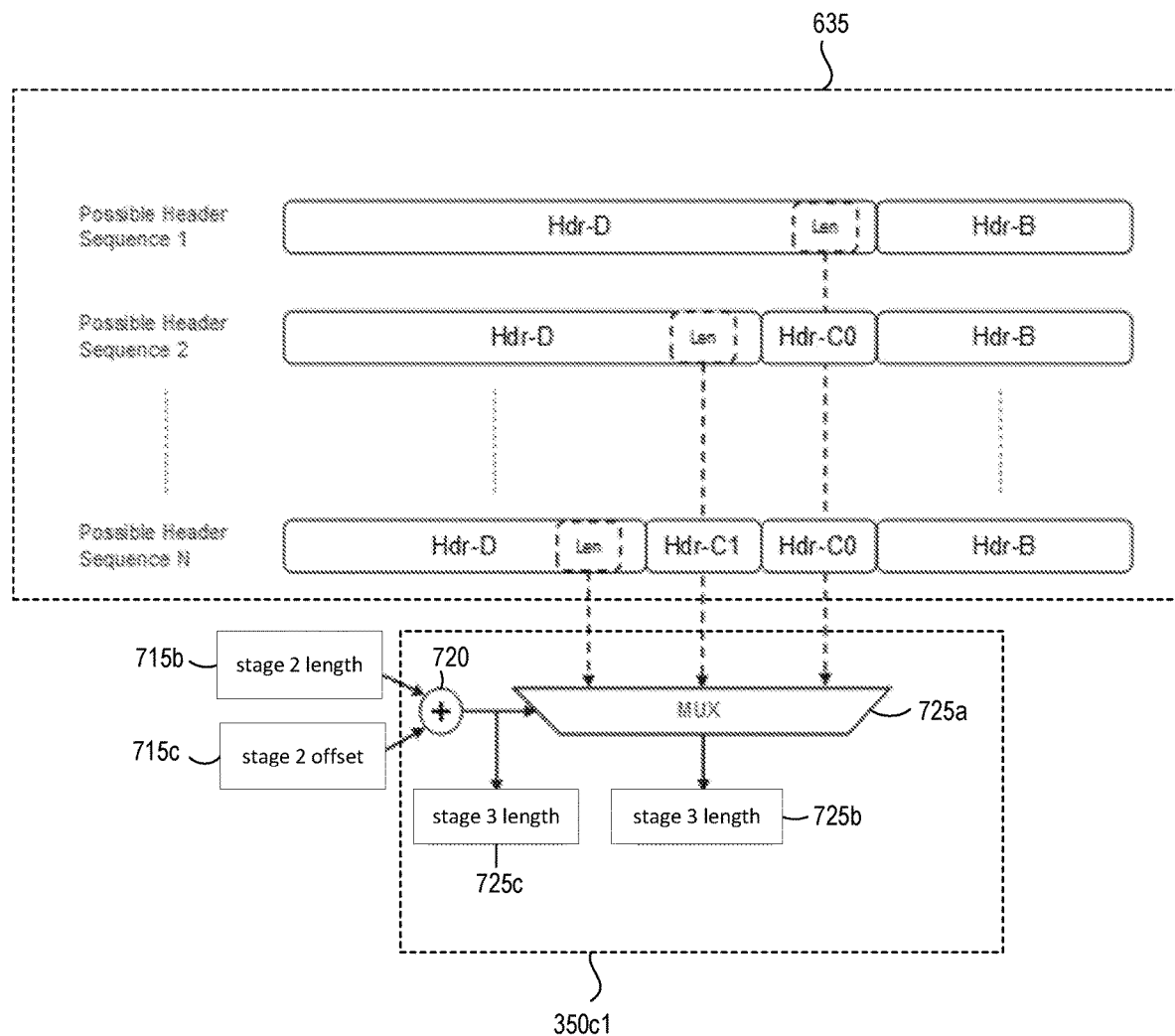
FIG. 8 depicts a block diagram representation of an exemplary pipeline stage configured to determine a length from an inner packet header using speculative field extraction.

FIG. 8 depicts a block diagram representation of an exemplary pipeline stage configured to determine a length from an inner packet header using speculative field extraction. In this depicted example, the third HLID circuit 350c1 is configured to read header D's length information in the third parsing stage 635.

As shown in the depicted example, the length field of header D may occur in different places in a data packet, depending on what headers precede it. The length of header D may be constant (e.g., a fixed length for IPv6) or a variable (e.g., a variable length for IPv4.). In this depicted example, when the parse graph is determined (e.g., the parse graph 600), it can be predetermined that header D may appear in three possible places: header D may follow header B; header D may follow header C0; or header D may follow header C1. Three possible length information signals indicative of the bit position of the length field of header D are transmitted to a three-input multiplexer 725a. When the data packet (e.g., the data packet 230) is received, possible information is stored in the SFEC 345. The HLID 350c1 selects the correct header length information, where the selection is based on a function (e.g., summation) of the length 715b and the offset 715c values determined in the prior stage HLID 350b1 from the second stage. Header B may also contain information which directs the next transition that follows header D, as described with reference to FIG. 7(B). For example, because header B may indicate a transition to header C0, and header C0 may indicate a transition to header D, correct and accurate determination of a position of the length field in header D may depend on the actual sequence of headers in the packet.

Figure 9:
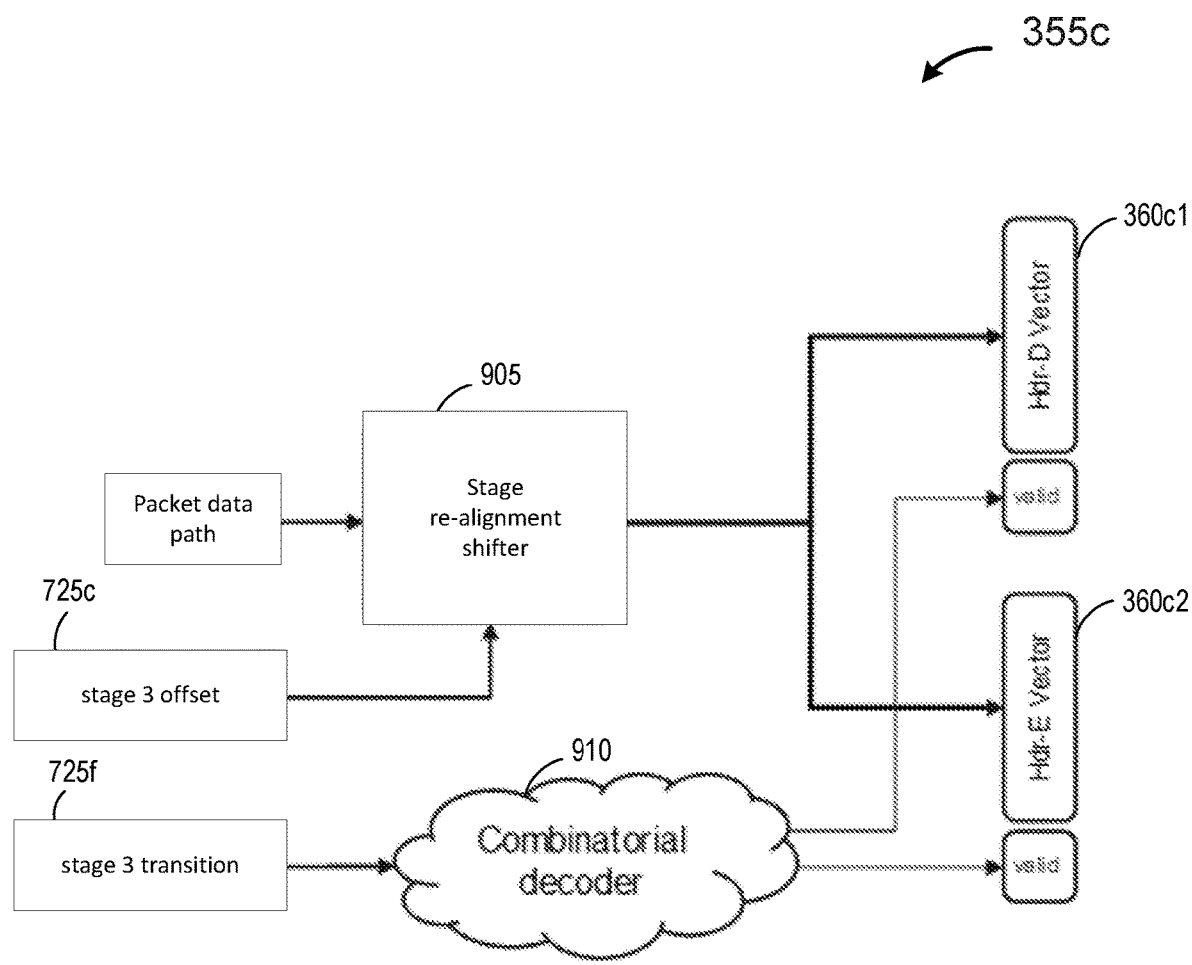
FIG. 9 depicts an exemplary field extraction module configured to align packet data and extract header fields of interest after resolving the header sequence.

FIG. 9 depicts an exemplary field extraction module configured to align packet data and extract header fields of interest after resolving the header sequence. In each stage, a field extraction module may be used to substantially reduce or eliminate barrel shifting in order to extract actual values of header field information, for example. In the depicted example, the field extraction module 355c includes a re-alignment shifter 905. The shifter 905 receives a data packet and an offset value (e.g., the third parsing stage offset) of its corresponding stage and generates an offset-shifted result that selects the value of the field of interest. The offset shifted result signal is coupled to generate an actual output of header length of header D to be stored in a first vector register 360c1 and an actual output of header length of header E to be stored in a second vector register 360c2. A combinatorial decoder circuit 910 is used to enable or disable the output of header D length 360c1 and header E length 360c2 through a valid or invalid signal in response to the third parsing stage transition information stored in the header transition circuit 725f. The transition signal may indicate when any of the header lengths are valid. Sharing one field extraction module for one parsing stage may advantageously reduce resources required on, for example, a die. However, each of the parsing stages 615, 625, 635, 645 may each be coupled to independent, unshared, and separate field extraction modules.

In some embodiments, the enabled one of the vector registers 360c1-c2 may be used directly to supply an actual field value (e.g., length) to an adder of an adjacent more significant stage. In some implementations, the extracted field values may be passed to subsequent processing stages, such as, for example, the match-action pipeline 320 and/or the deparser 330.

In an illustrative example, a data packet may have headers to be parsed, and the headers correspond to a protocol that may be, for example, an internet protocol. In this example, it is desired to extract a packet's source address, which is defined to be bits [11]-[17] from a field in the header. The level re-alignment shifter 905 moves bit [11] of the input to bit [0] of the vector register, and shifts input bit [17] to bit [6] of the vector register. The offset signal input to the shifter 905 may align the packet, for example, to the starting bit position of the source address field. Then, the data in the vector register bits [0:6] represents the actual value of the packet's source address.

In various implementations, the width of the vector registers 360c1-c2 may be different based on the width of the fields of interest. For example, the width may be from 1 to at least 1024 bits.

In some embodiments, speculative field extraction, in accordance with some embodiments described herein, may be performed alone or in combination with the field extraction module 370. For example, once the header sequence, length and field position have been resolved, field extraction may be performed without the field extraction module 370. In some examples, field extraction may be performed using independent, unshared resources for the realignment shift logic.

Although various embodiments have been described with reference to the figures, other embodiments are possible. For example, each header may have a field extraction module. A high-level programmer may annotate the parser description to drive its implementation characteristics, particularly the assignment of headers to levels or stages of a pipeline.

In some embodiments, an FPGA implementation may be compatible with communication speeds from 10 Gbps to 400 Gbps. To achieve a range of desired bandwidth, a data path interface width may be varied from 32 b to 1024 b. In various embodiments, by way of example and not limitation, operating circuit clock speed may range from 300 MHz to at least 600 MHz. In some embodiments, an ASIC implementation may be compatible with a higher communication speeds from 1 Gbps to at least about 1000 Gbps, for example. The data path interface width may be varied from 16 b to 2048 b and the operating circuit clock speed may range, for example, from about 100 MHz to at least about 1000 MHz.

Various examples of modules may be implemented using circuitry, including various electronic hardware. By way of example and not limitation, the hardware may include transistors, resistors, capacitors, switches, integrated circuits and/or other modules. In various examples, the modules may include analog and/or digital logic, discrete components, traces and/or memory circuits fabricated on a silicon substrate including various integrated circuits. In some embodiments, the module(s) may involve execution of preprogrammed instructions and/or software executed by a processor. For example, various modules may involve both hardware and software.

Although various embodiments may be implemented using reconfigurable programmable logic blocks (e.g., FPGA), other embodiments may be implemented in fixed instantiations (e.g., ASIC). While dedicated hard block circuitry in an ASIC implementation may not be reconfigurable once instantiated in an integrated circuit, for example, an ASIC implementation may, in some implementations, provide for a minimized platform with respect to, for example, power consumption and/or die area.

In an illustrative example, a parsing circuit comprising m parsing stage circuits, each of the $2^{nd}, 3^{rd}, \ldots m^{th}$ parsing stage circuits may include a multiplexer configured to receive n possible header length information from a corresponding parsing stage of the m parsing stages, where n is the number of possible header positions. The multiplexer of a stage may, for example, be controlled to select to output header field information from the correct one of the parallel processing circuits, where the correct one is determined based header field length information and a header offset information generated from an adjacent less-significant parsing stage circuit. Accordingly, header information extracted from stage m-1 may be used, in various hardware streaming implementations, to determine the correct control signal for selection of the correct header processing circuit for the subsequent stage m.

In some implementations, a field extraction module may use shared shift logic in the form of re-alignment shifter 905 for all headers assigned to a single pipeline stage in accordance with some embodiments.

In some embodiments, the parse graph may be a fixed parse graph and may not be changed after manufacture (e.g., hard block, ASIC implementation). In some embodiments, a reconfigurable device with programmable logic, such as an FPGA, may, in some implementations, be reconfigured (e.g., with a new design-time cycle and compile-time processing) in the field to provide for modifications or an entirely new custom application, for example.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. An integrated circuit comprising:
a speculative field extraction circuit (SFEC) associated with a plurality of stages in a pipeline for parsing headers in a data packet, each of the plurality of stages is associated with a respective subset of a plurality of subsets of the headers, and each of the plurality of subsets is determined based on a plurality of possible header sequences in a header of the headers, wherein the SFEC is configured to:
speculatively select, for a first stage of the plurality of stages, a first predetermined field corresponding to a first predetermined bit position within the data packet from a first subset of the plurality of subsets; and
speculatively select, for a second stage of the plurality of stages, second predetermined fields corresponding to second predetermined bit positions within the data packet from a second subset of the plurality of subsets; and
an extracted field processing circuit (EFPC) comprising m Header Sequence Identifier (HSID) circuits each associated with a respective stage of the plurality of stages, each of the HSID circuits being more significant than a previous one of the HSID circuits, wherein:
a $1^{st}$ HSID circuit of the HSID circuits is configured to select a correct bit position of the first predetermined field, and determine length information, offset information, and transition information for the first predetermined field, and
a $2^{nd}$ HSID circuit of the HSID circuits configured to select a second correct predetermined field from the second predetermined fields based on one of the length information and the transition information received from the $1^{st}$ HSID circuit, and read field information from the second correct predetermined field,
wherein, each of a $3^{rd}, \ldots m^{th}$ HSID circuits of the HSID circuits comprises a respective selector circuit configured to select a respective correct selected predetermined field from among a plurality of selected predetermined fields to output header field information based on a combination of offset information and one of length information and transition information, and wherein the offset information, the length information, and the transition of information are of an adjacent, less significant HSID circuit.

2. The integrated circuit of claim 1, further comprising a plurality of field extraction (FEM) circuits, each of the FEM circuits configured to align to the data packet to capture, respectively, actual contents of extracted field values in a vector output register.

3. The integrated circuit of claim 2, wherein the FEM circuits are further configured to align the data packet in response to an offset information and a transition information received from a corresponding HSID circuit of the HSID circuits.

4. The integrated circuit of claim 1, wherein the $1^{st}$ HSID circuit comprises a register to directly receive field information from the selected correct bit position of the first predetermined field from a corresponding $1^{st}$ stage of the plurality of stages of the SFEC.

5. The integrated circuit of claim 1, wherein the selector circuit in each of the $3^{rd}$, . . . $m^{th}$ HSID circuits selects the correct selected predetermined field based on a summation of the offset information and the length information of the adjacent, less significant HSID circuit.

6. The integrated circuit of claim 1, wherein the selector circuit in each of the $3^{rd}$, . . . $m^{th}$ HSID circuits selects the correct selected predetermined field based on a summation of the offset information and the transition information of the adjacent, less significant HSID circuit.

7. The integrated circuit of claim 1, wherein the first predetermined field comprises length information associated with a header selected from the first subset of the plurality of subsets.

8. The integrated circuit of claim 1, wherein the first predetermined field comprises transition information indicative of a subsequent header in the data packet.

9. The integrated circuit of claim 1, wherein the SFEC is further configured to select the correct selected predetermined field from a header in a data packet for every predetermined possible sequence of the headers in the data packet.

10. The integrated circuit of claim 1, wherein the SFEC further comprises a register circuit to capture field value information at the first predetermined bit position and/or the second predetermined bit positions within the data packet.

11. The integrated circuit of claim 1, wherein the plurality of stages represent a necessary and sufficient number of possible packet header sequences defined according to a predetermined parse graph.

12. The integrated circuit of claim 1, wherein the SFEC and the EFPC are implemented in an ASIC.

13. The integrated circuit of claim 1, wherein the SFEC and the EFPC are implemented in programmable logic of a field programmable gate array (FPGA).

14. A method to perform data packet parsing on an integrated circuit, the method comprising:
  speculatively selecting, with a speculative field extraction circuit (SFEC) associated with a plurality of stages in a pipeline for parsing headers in a data packet and for a first stage of the plurality of stages, a first predetermined field corresponding to first predetermined bit position within the data packet from a first subset of a plurality of subsets, wherein each of the plurality of subsets is determined based on a plurality of possible header sequences in a header of the headers;
  speculatively selecting, with the SFEC and for a second stage of the plurality of stages, second predetermined fields corresponding to second predetermined bit positions within the data packet from a second subset of the plurality of subsets; and
  providing an extracted field processing circuit (EFPC) comprising m Header Sequence Identifier (HSID) circuits each associated with a respective stage of the plurality of stages, each of the HSID circuits being more significant than a previous one of the HSID circuits, wherein:
    a $1^{st}$ HSID circuit of the HSID circuits is configured to select a correct bit position of the first predetermined field, and determine length information, offset information, and transition information for the first predetermined field, and
    a $2^{nd}$ HSID circuit of the HSID circuits is configured to select a second correct predetermined field from the second predetermined fields based on one of the length information and the transition information received from the $1^{st}$ HSID circuits, and read field information from the second correct predetermined field
  wherein, a selector circuit in each of a $3^{rd}$, . . . $m^{th}$ HSID circuits of the HSID circuits is configured to select a respective correct selected predetermined field from among a plurality of selected predetermined fields to output header field information based on a combination of offset information and one of length information and transition information and wherein the offset information, the length information, and the transition of information are of an adjacent, less significant HSID circuit.

15. The method of claim 14, further comprising a plurality of field extraction (FEM) circuits, each of the FEM circuits configured to align to the data packet to capture, respectively, actual contents of extracted field values in a vector output register.

16. The method of claim 15, further comprising aligning, with the FEM circuits, the data packet in response to an offset information and a transition information received from a corresponding HSID circuit of the HSID circuits.

17. The method of claim 14, further comprising directly receiving, with the $1^{st}$ HSID circuit, which comprises a register, field information from the selected correct bit position of the first predetermined field from a corresponding $1^{st}$ stage of the SFEC.

18. The method of claim 14, wherein the SFEC and the EFPC are implemented in an ASIC.

19. The method of claim 14, wherein the SFEC and the EFPC are implemented in programmable logic of a field programmable gate array (FPGA).

20. The method of claim 14, wherein the first predetermined field comprises transition information indicative of a subsequent header in the data packet.

* * * * *